United States Patent
Sadek (10) Patent No.: US 9,756,679 B2
(45) Date of Patent: Sep. 5, 2017

(54) DISCONTINUOUS RECEPTION (DRX)-AWARE CARRIER SENSE ADAPTIVE TRANSMISSION (CSAT) IN SHARED SPECTRUM

(71) Applicant: QUALCOMM Incorporated, San Diego, CA (US)

(72) Inventor: Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/680,465

(22) Filed: Apr. 7, 2015

(65) Prior Publication Data
US 2015/0296560 A1    Oct. 15, 2015

Related U.S. Application Data (60) Provisional application No. 61/978,698, filed on Apr. 11, 2014.

(51) Int. Cl.
*H04W 76/04* (2009.01)
*H04W 72/12* (2009.01)
(Continued)

(52) U.S. Cl.
CPC ..... *H04W 76/048* (2013.01); *H04W 72/1215* (2013.01); *H04W 16/14* (2013.01);
(Continued)

(58) Field of Classification Search
CPC .... H04L 1/1887; H04L 1/1812; H04W 68/12; H04W 88/06; H04W 68/00;
(Continued)

(56) References Cited

U.S. PATENT DOCUMENTS

2008/0132230 A1*  6/2008 Marinier ............... H04W 48/08
                                                                    455/434
2009/0207794 A1*  8/2009 Meylan ............... H04W 76/048
                                                                    370/329
(Continued)

FOREIGN PATENT DOCUMENTS

CN    WO 2013/131257    *  9/2013    ............ H04W 16/14
EP         2709415 A1       3/2014
(Continued)

OTHER PUBLICATIONS

International Search Report and Written Opinion—PCT/US2015/024974—ISA/EPO—Jul. 7, 2015.
(Continued)

*Primary Examiner* — Edan Orgad
*Assistant Examiner* — Ivan O Latorre
(74) *Attorney, Agent, or Firm* — Muncy, Geissler, Olds & Lowe. P.C.

(57) ABSTRACT

Systems and methods for Discontinuous Reception (DRX)-aware Carrier Sense Adaptive Transmission (CSAT) communication in shared spectrum are disclosed. An access point, for example, may receive signals via a medium in accordance with a first RAT, and identify utilization of the medium associated with the first RAT based on the received signals. Based on the identified utilization of the medium, operation of a second RAT may be cycled between activated and deactivated periods of transmission over the medium in accordance with a Time Division Multiplexing (TDM) communication pattern. A Medium Access Control (MAC) Control Element (CE) may be transmitted to an access terminal associated with the second RAT to activate or deactivate the access terminal in accordance with the TDM communication pattern. The timing of the MAC CE transmission may be
(Continued)

based on the TDM communication pattern and a DRX pattern associated with the access terminal.

30 Claims, 7 Drawing Sheets

(51) Int. Cl.
| | | |
|---|---|---|
| H04W 74/08 | (2009.01) | |
| H04W 84/04 | (2009.01) | |
| H04W 88/06 | (2009.01) | |
| H04W 88/10 | (2009.01) | |
| H04W 76/02 | (2009.01) | |
| H04W 16/14 | (2009.01) | |

(52) U.S. Cl.
CPC .... H04W 72/1289 (2013.01); H04W 74/0808 (2013.01); H04W 76/026 (2013.01); H04W 84/045 (2013.01); H04W 88/06 (2013.01); H04W 88/10 (2013.01)

(58) Field of Classification Search
CPC .......... H04W 76/048; H04W 72/1215; H04W 52/0235; H04W 72/04; H04W 74/0808; H04W 16/14; H04W 88/10; H04W 84/045; H04W 72/0446; H04W 72/1289; H04W 76/026; Y06B 60/50; H04J 3/00; H04J 3/1694; H04B 7/2643
USPC ....... 370/230, 336, 252, 278, 329, 328, 335, 370/337, 311, 254; 455/552.1, 452.1, 450
See application file for complete search history.

(56) References Cited

U.S. PATENT DOCUMENTS

| | | | | |
|---|---|---|---|---|
| 2010/0323683 | A1* | 12/2010 | Kazmi | H04W 64/00 455/422.1 |
| 2011/0002281 | A1* | 1/2011 | Terry | H04W 76/048 370/329 |
| 2012/0069766 | A1* | 3/2012 | Fu | H04B 1/406 370/252 |
| 2012/0082140 | A1* | 4/2012 | Lin | H04W 72/1215 370/336 |
| 2012/0155303 | A1 | 6/2012 | Kuo | |
| 2012/0188907 | A1* | 7/2012 | Dayal | H04W 72/1215 370/254 |
| 2012/0207040 | A1 | 8/2012 | Comsa et al. | |
| 2013/0114583 | A1 | 5/2013 | Park et al. | |
| 2013/0201884 | A1 | 8/2013 | Freda et al. | |
| 2013/0208587 | A1 | 8/2013 | Bala et al. | |
| 2013/0272260 | A1* | 10/2013 | Bitran | H04W 16/14 370/329 |
| 2013/0301421 | A1* | 11/2013 | Yi | H04W 52/0216 370/241 |
| 2013/0322279 | A1 | 12/2013 | Chincholi et al. | |
| 2014/0043979 | A1* | 2/2014 | Etemad | H04B 7/2656 370/237 |
| 2014/0044105 | A1* | 2/2014 | Bontu | H04L 5/001 370/336 |
| 2014/0064174 | A1* | 3/2014 | Abe | H04W 56/00 370/311 |
| 2014/0087748 | A1* | 3/2014 | Hong | H04W 72/1215 455/452.1 |
| 2015/0043520 | A1* | 2/2015 | Sun | H04L 5/001 370/330 |
| 2015/0189691 | A1* | 7/2015 | Zhang | H04L 5/0007 370/311 |
| 2015/0195867 | A1* | 7/2015 | Koc | H04W 76/048 370/311 |
| 2015/0230286 | A1* | 8/2015 | Feuersaenger | H04W 72/1215 370/252 |
| 2015/0271692 | A1* | 9/2015 | Han | H04L 5/0098 370/252 |
| 2015/0351151 | A1* | 12/2015 | Huang | H04W 36/0083 370/252 |

FOREIGN PATENT DOCUMENTS

| | | |
|---|---|---|
| WO | 2014044436 A1 | 3/2014 |
| WO | 2015047777 A2 | 4/2015 |

OTHER PUBLICATIONS

"Introducing LTE in Unlicensed Spectrum", 3GPP Draft; RP-131635 LTE in Unlicensed Spectrum, 3rd Generation Partnership Project Project (3GPP), Mobile Competence Centre ; 650, Route Des Lucioles ; F-06921 Sophia-Antipolis Cedex ; France no. Busan, South Korea; Dec. 3, 2013-Dec. 7, 2013 Dec. 2, 2013 (Dec. 2, 2013), XP050733706, Retrieved from the Internet: URL:http://www.3gpp.org/ftp/Meetings_3GPP_SYNC/RAN/Docs/ [retrieved on Dec. 2, 2013] the whole document.

Lorenzo Casaccia, "Extending the benefits of LTE to unlicensed spectrum", Jan. 21, 2014 (Jan. 21, 2014), pp. 1-34, XP055199007, Paris, France, Jan. 21-22, 2014 Retrieved from the Internet: URL:https://www.dropbox.com/sh/8xjlm6gcccgnuwd/QovKbhhX5T [retrieved on Jun. 30, 2015].

* cited by examiner

DISCONTINUOUS RECEPTION (DRX)-AWARE CARRIER SENSE ADAPTIVE TRANSMISSION (CSAT) IN SHARED SPECTRUM

CROSS-REFERENCE TO RELATED APPLICATIONS

The present Application for Patent claims the benefit of U.S. Provisional Application No. 61/978,698, entitled "DISCONTINOUS RECEPTION (DRX)-AWARE CARRIER SENSE ADAPTIVE TRANSMISSION (CSAT) IN UNLICENSED SPECTRUM," filed Apr. 11, 2014, assigned to the assignee hereof, and expressly incorporated herein by reference in its entirety.

INTRODUCTION

Aspects of this disclosure relate generally to telecommunications, and more particularly to co-existence between wireless Radio Access Technologies (RATs) and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Recently, small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

Systems and methods for Discontinuous Reception (DRX)-aware Carrier Sense Adaptive Transmission (CSAT) communication in shared spectrum are disclosed.

In one example, a method for CSAT for managing operation on a communication medium shared between Radio Access Technologies (RATs) is disclosed. The method may comprise, for example, receiving signals via the medium in accordance with a first RAT; identifying utilization of the medium associated with the first RAT based on the received signals; cycling operation of a second RAT between activated and deactivated periods of transmission over the medium in accordance with a Time Division Multiplexing (TDM) communication pattern, wherein the cycling is based on the identified utilization of the medium; and transmitting a Medium Access Control (MAC) Control Element (CE) to an access terminal associated with the second RAT to activate or deactivate the access terminal in accordance with the TDM communication pattern, wherein a timing of the MAC CE transmission is based on the TDM communication pattern and a DRX pattern associated with the access terminal.

In another example, an apparatus for CSAT for managing operation on a communication medium shared between RATs is disclosed. The apparatus may comprise, for example, first and second transceivers and a processor. The first transceiver may be configured to receive signals via the medium in accordance with a first RAT. The processor may be configured to identify utilization of the medium associated with the first RAT based on the received signals, and to cycle operation of a second RAT between activated and deactivated periods of transmission over the medium in accordance with a TDM communication pattern, wherein the cycling is based on the identified utilization of the medium. The second transceiver may be configured to transmit a MAC CE to an access terminal associated with the second RAT to activate or deactivate the access terminal in accordance with the TDM communication pattern, wherein a timing of the MAC CE transmission is based on the TDM communication pattern and a DRX pattern associated with the access terminal.

In another example, another apparatus for CSAT for managing operation on a communication medium shared between RATs is disclosed. The apparatus may comprise, for example, means for receiving signals via the medium in accordance with a first RAT; means for identifying utilization of the medium associated with the first RAT based on the received signals; means for cycling operation of a second RAT between activated and deactivated periods of transmission over the medium in accordance with a TDM communication pattern, wherein the cycling is based on the identified utilization of the medium; and means for transmitting a MAC CE to an access terminal associated with the second RAT to activate or deactivate the access terminal in accordance with the TDM communication pattern, wherein a timing of the MAC CE transmission is based on the TDM communication pattern and a DRX pattern associated with the access terminal.

In another example, a transitory or non-transitory computer-readable medium including code, which, when executed by a processor, causes the processor to perform operations for managing operation on a communication medium shared between RATs is disclosed. The computer-readable medium may comprise, for example, instructions for receiving signals via the medium in accordance with a first RAT; instructions for identifying utilization of the medium associated with the first RAT based on the received signals; instructions for cycling operation of a second RAT between activated and deactivated periods of transmission over the medium in accordance with a TDM communication pattern, wherein the cycling is based on the identified utilization of the medium; and instructions for transmitting a MAC CE to an access terminal associated with the second RAT to activate or deactivate the access terminal in accordance with the TDM communication pattern, wherein a timing of the MAC CE transmission is based on the TDM communication pattern and a DRX pattern associated with the access terminal.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to Discontinuous Reception (DRX)-aware Carrier Sense Adaptive Transmission (CSAT). Access points implementing CSAT may be configured to send Medium Access Control (MAC) Control Element (CE) activation and deactivation commands not only in accordance with the corresponding CSAT Time Division Multiplexing (TDM) communication pattern, but also taking into account each access terminal's DRX pattern to ensure that the MAC CEs are properly received. In some scenarios, various DRX parameters may also be modified or otherwise set to better coordinate DRX alignment with at least a portion of the TDM communication pattern.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
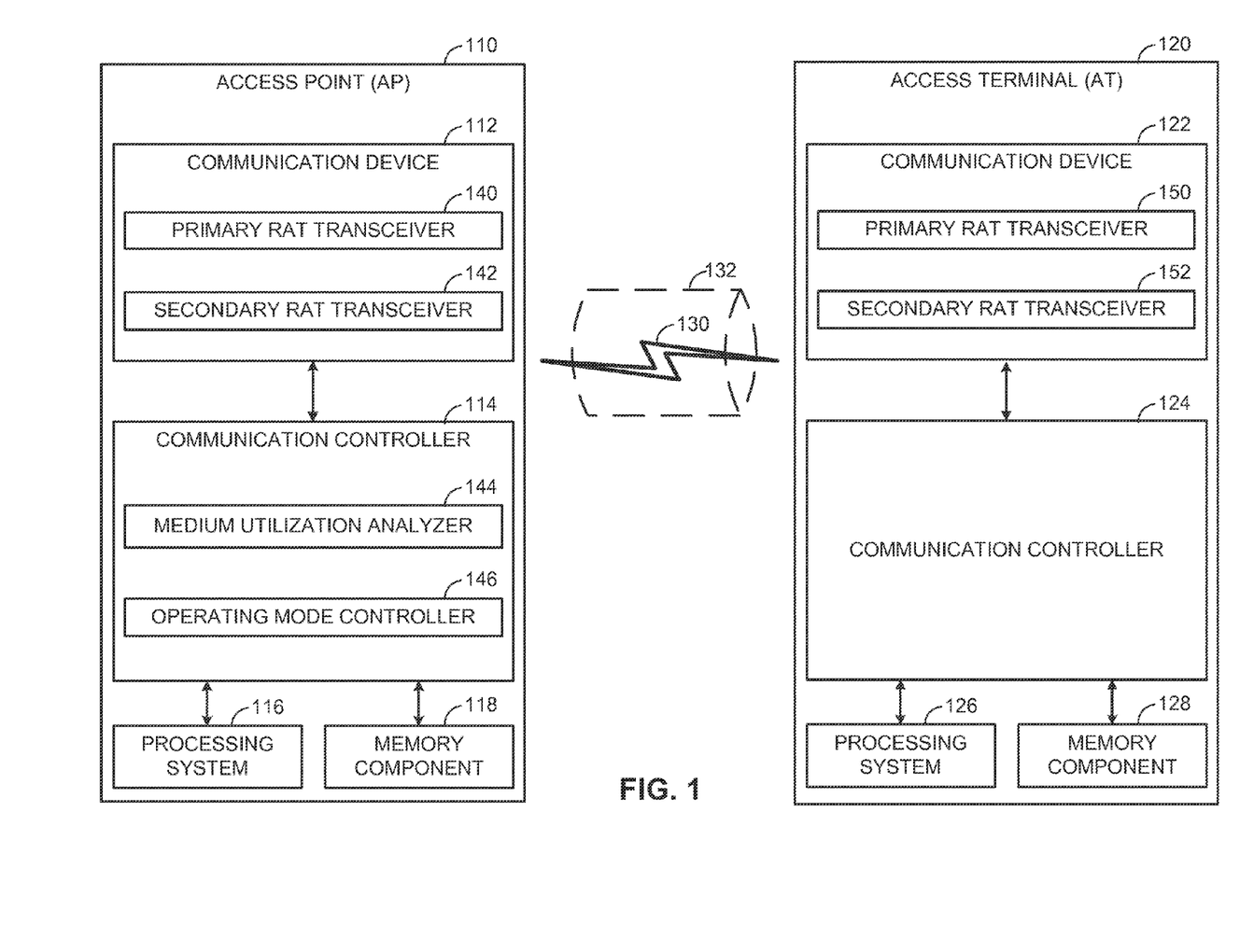
FIG. 1 illustrates an example wireless communication system including an Access Point (AP) in communication with an Access Terminal (AT).

FIG. 1 illustrates an example wireless communication system including an Access Point (AP) in communication with an Access Terminal (AT). Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wi-Fi APs, other small coverage area APs, etc. Small cells may be deployed to supplement macro cell coverage, which may cover a few blocks within a neighborhood or several square miles in a rural environment, thereby leading to improved signaling, incremental capacity growth, richer user experience, and so on.

In the example of FIG. 1, the access point 110 and the access terminal 120 each generally include a wireless communication device (represented by the communication devices 112 and 122) for communicating with other network nodes via at least one designated RAT. The communication devices 112 and 122 may be variously configured for transmitting and encoding signals (e.g., messages, indications, information, and so on), and, conversely, for receiving and decoding signals (e.g., messages, indications, information, pilots, and so on) in accordance with the designated RAT. The access point 110 and the access terminal 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may operate at the direction of or otherwise in conjunction with respective host system functionality (illustrated as the processing systems 116 and 126 and the memory components 118 and 128). In some designs, the communication controllers 114 and 124 may be partly or wholly subsumed by the respective host system functionality.

Turning to the illustrated communication in more detail, the access terminal 120 may transmit and receive messages via a wireless link 130 with the access point 110, the message including information related to various types of communication (e.g., voice, data, multimedia services, associated control signaling, etc.). The wireless link 130 may operate over a communication medium of interest, shown by way of example in FIG. 1 as the medium 132, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the access point 110 and the access terminal 120 for the medium 132.

As a particular example, the medium 132 may correspond to at least a portion of an unlicensed frequency band shared with other RATs. In general, the access point 110 and the access terminal 120 may operate via the wireless link 130 according to one or more RATs depending on the network in which they are deployed. These networks may include, for example, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for such communications (e.g., by a government entity such as the Federal Communications Commission (FCC) in the United States), certain communication networks, in particular those employing small cell access points, have extended operation into unlicensed frequency bands such as the Unlicensed National Information Infrastructure (U-NII) band used by Wireless Local Area Network (WLAN) technologies, most notably IEEE 802.11x WLAN technologies generally referred to as "Wi-Fi."

In the example of FIG. 1, the communication device 112 of the access point 110 includes two co-located transceivers operating according to respective RATs, including a primary RAT transceiver 140 configured to operate in accordance with one RAT and a secondary RAT transceiver 142 configured to operate in accordance with another RAT. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a Wi-Fi chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The primary RAT transceiver 140 and the secondary RAT transceiver 142 may provide different functionalities and may be used for different purposes. As an example, the primary RAT transceiver 140 may operate in accordance with Long Term Evolution (LTE) technology to provide communication with the access terminal 120 on the wireless link 130, while the secondary RAT transceiver 142 may operate in accordance with Wi-Fi technology to monitor Wi-Fi signaling on the medium 132 that may interfere with or be interfered with by the LTE communications. The secondary RAT transceiver 142 may or may not serve as a full Wi-Fi AP providing communication services to a corresponding Basic Service Set (BSS). The communication device 122 of the access terminal 120 may, in some designs, include similar primary RAT transceiver and/or secondary RAT transceiver functionality, as shown in FIG. 1 by way of the primary RAT transceiver 150 and the secondary RAT transceiver 152, although such dual-transceiver functionality may not be required.

As will be discussed in more detail below with reference to FIGS. 2-8, the communication controller 114 of the access point 110 may include a medium utilization analyzer 144 and an operating mode controller 146, which may operate in conjunction with the primary RAT transceiver 140 and/or the secondary RAT transceiver 142 to manage operation on the medium 132.

Figure 2:
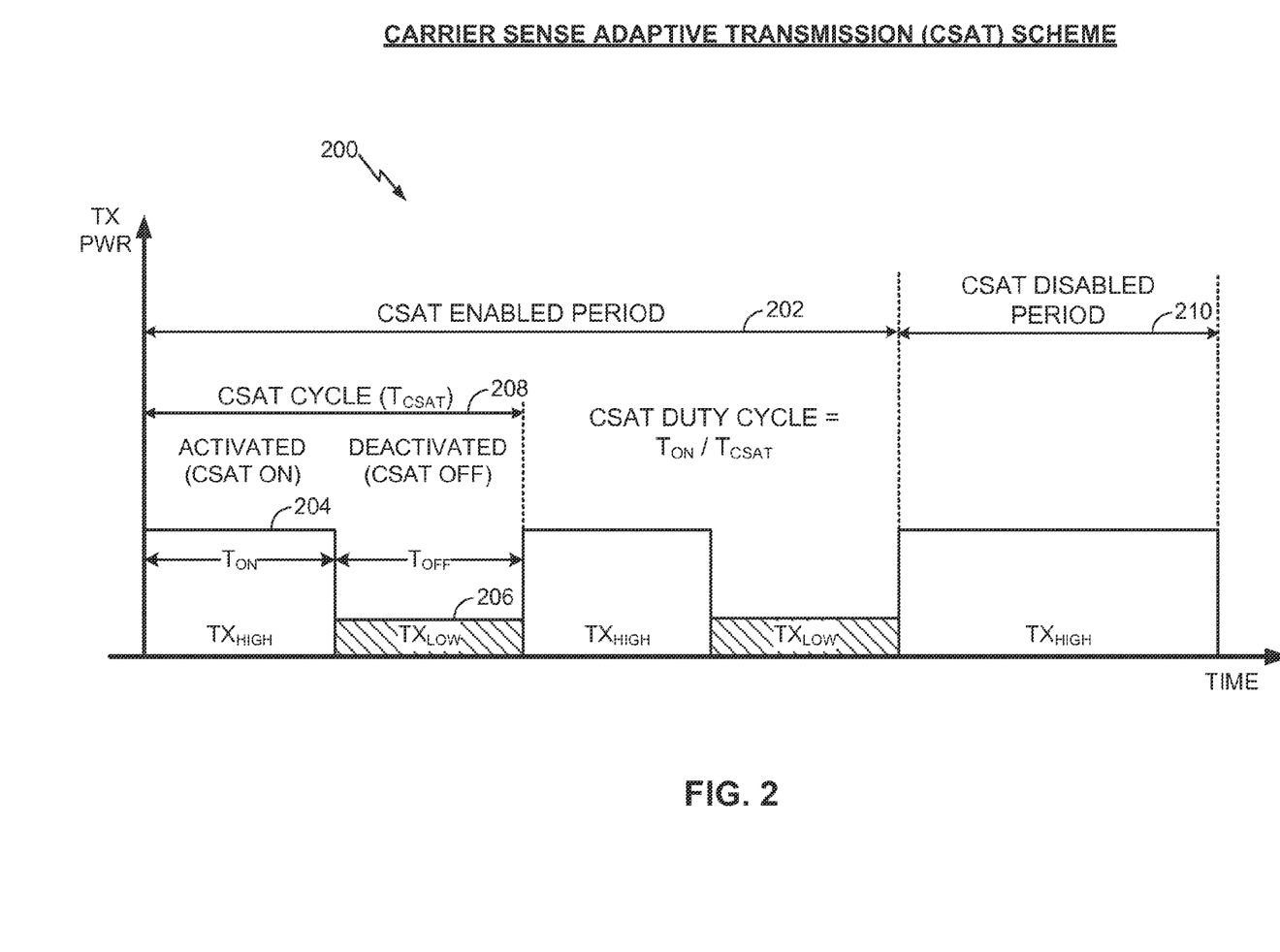
FIG. 2 is a system-level diagram illustrating cross-link interference between Radio Access Technologies (RATs) on a shared communication medium.

FIG. 2 illustrates certain aspects of an example long-term Time Division Multiplexed (TDM) communication scheme referred to herein as Carrier Sense Adaptive Transmission (CSAT) that may be implemented on the medium 132. A CSAT communication scheme may be used to foster co-existence between (i) primary RAT communications between the access point 110 and access terminal 120 and (ii) other, secondary RAT communications between neighboring devices, for example, by cycling operation of the primary RAT over the medium 132 (e.g., on a corresponding Secondary Cell (SCell) provided by the access point 110 on the unlicensed band) in accordance with a TDM communication pattern 200. A CSAT communication scheme as provided herein may offer several advantages for mixed-RAT co-existence environments.

As shown, during a CSAT enabled period 202, operation of the primary RAT may be cycled over time between activated (CSAT ON) periods 204 and deactivated (CSAT OFF) periods 206. A given activated period 204/deactivated period 206 pair may constitute a CSAT cycle ($T_{CSAT}$) 208. During a period of time $T_{ON}$ associated with each activated period 204, primary RAT transmission on the medium 132 may proceed at a normal, relatively high transmission power. During a period of time $T_{OFF}$ associated with each deactivated period 206, however, primary RAT transmission on the medium 132 is reduced or even fully disabled to yield the medium 132 to neighboring devices operating according to the secondary RAT. By contrast, during a CSAT disabled period 210, the cycling may be disabled.

Each of the associated CSAT parameters, including, for example, a duty cycle (i.e., $T_{ON}/T_{CSAT}$) and the respective transmission powers during activated periods 204 and deactivated periods 206, may be adapted based on the current signaling conditions on the medium 132 to dynamically optimize the CSAT communication scheme. For example, the secondary RAT transceiver 142 configured to operate in accordance with the secondary RAT (e.g., Wi-Fi) may be further configured to monitor the medium 132 for secondary RAT signaling, which may interfere with or be interfered with by primary RAT communications over the medium 132. The medium utilization analyzer 144 may be configured to determine a utilization metric associated with utilization of the medium 132 by the secondary RAT signaling. Based on the utilization metric, the associated parameters may be set by the operating mode controller 146 and the primary RAT transceiver 140 configured to operate in accordance with the primary RAT (e.g., LTE) may be further configured to cycle between activated periods 204 of communication and deactivated periods 206 of communication over the medium 132 in accordance therewith. As an example, if the utilization metric is high (e.g., above a threshold), one or more of the parameters may be adjusted such that usage of the medium 132 by the primary RAT transceiver 140 is reduced (e.g., via a decrease in the duty cycle or transmission power). Conversely, if the utilization metric is low (e.g., below a threshold), one or more of the parameters may be adjusted such that usage of the medium 132 by the primary RAT transceiver 140 is increased (e.g., via an increase in the duty cycle or transmission power).

As a further enhancement, access terminal synchronization with CSAT and its corresponding TDM communication pattern may be coordinated with other communication system operations, such as Discontinuous Reception (DRX).

Figure 3:
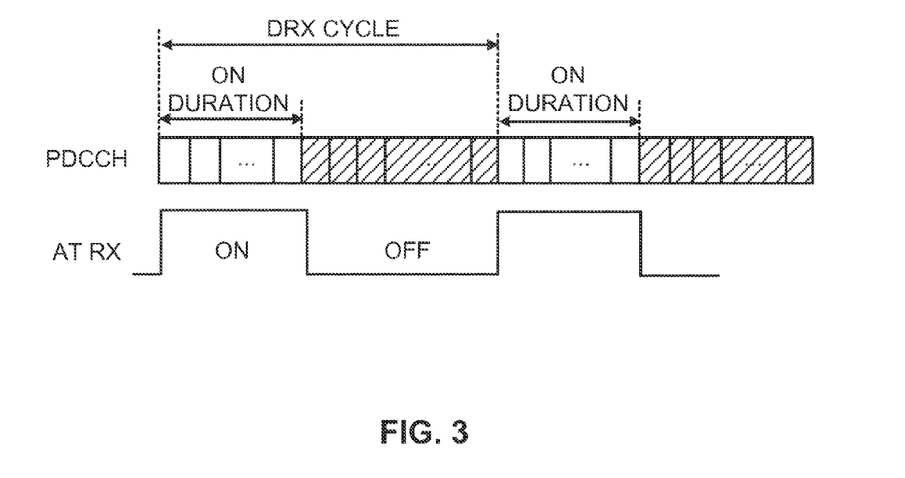
FIG. 3 illustrates an example Discontinuous Reception (DRX) communication mode.

FIG. 3 illustrates an example DRX communication mode, which may be used to communicate with certain access terminals for applications that do not require continuous reception. As shown, during certain predetermined or negotiated times, the access terminal's receiver (RX) is turned ON (e.g., in a connected state), while at other times, it is turned OFF (referred to as a DRX gap) and the access terminal enters a low power state. For example, the primary RAT transceiver 150 of the access terminal 120 may be turned ON and OFF in this manner. During the ON duration of a given DRX cycle, the access terminal's receiver may monitor a corresponding control channel or the like (illustrated as an LTE Physical Downlink Control Channel (PDCCH)) to identify downlink data. The access point serving the access terminal (e.g., the access point 110 serving the access terminal 120) may control or otherwise be aware of the DRX operation, and schedule communications accordingly.

In general, DRX allows a device to conserve battery power by monitoring control channels only at configurable or predetermined intervals rather than continuously. However, for various reasons, DRX operation may not be fully synchronized with CSAT operation, such that an access terminal in DRX mode may go to sleep (e.g., enter a DRX OFF period) in the middle of a CSAT ON (activated) period and/or wake up (e.g., enter a DRX ON period) in the middle of a CSAT OFF (deactivated) period. In these situations, the access terminal may not properly receive a Medium Access Control (MAC) Control Element (CE) activation or deactivation command, and may become unsynchronized with CSAT ON/OFF cycling, resulting in corruption of the access terminal's channel estimation and timing loops. For example, an access terminal in a MAC activated mode during a CSAT ON (activated) period may, in accordance with its DRX cycle, go to sleep (e.g., enter a DRX OFF period) before reaching the next CSAT OFF (deactivated) period and therefore before receiving the corresponding MAC CE deactivation command. Since DRX by itself does not change the state of the MAC activated/deactivated mode, if the access terminal subsequently wakes up (e.g., enters a DRX ON period) during the CSAT OFF (deactivated) period, the access terminal will remain in the MAC activated mode and attempt to perform various measurements during the CSAT OFF (deactivated) period, such as Carrier-to-Interference (C/I) measurements, Channel Quality Indicator (CQI) measurements, Reference Signal Received Power (RSRP) measurements, Reference Signal Received Quality (RSRQ) measurements, and so on. The access terminal will not be able to find the access point during this time, however, since the access point is turned off, and the measurements will be corrupted.

To address such issues, access points implementing CSAT such as the access point 110 may be configured to send MAC CE activation and deactivation commands not only in accordance with the corresponding TDM communication pattern, but also take into account each access terminal's DRX pattern to ensure that the MAC CEs are properly received. That is, the access point may send a given MAC CE early or late (in comparison with the CSAT ON/OFF boundary) to correspond with a DRX ON period. For example, to enter an access terminal into a MAC deactivated mode, a MAC CE deactivation command may be sent normally, in anticipation of a CSAT OFF transition, or early, in anticipation of a DRX OFF transition if it occurs prior to the CSAT OFF (deactivated) period. Conversely, to enter an access terminal into a MAC activated mode, a MAC CE activation command may be sent normally, in anticipation of a CSAT ON transition, or delayed, following a DRX ON transition if it occurs during the CSAT ON (activated) period.

Figure 4:
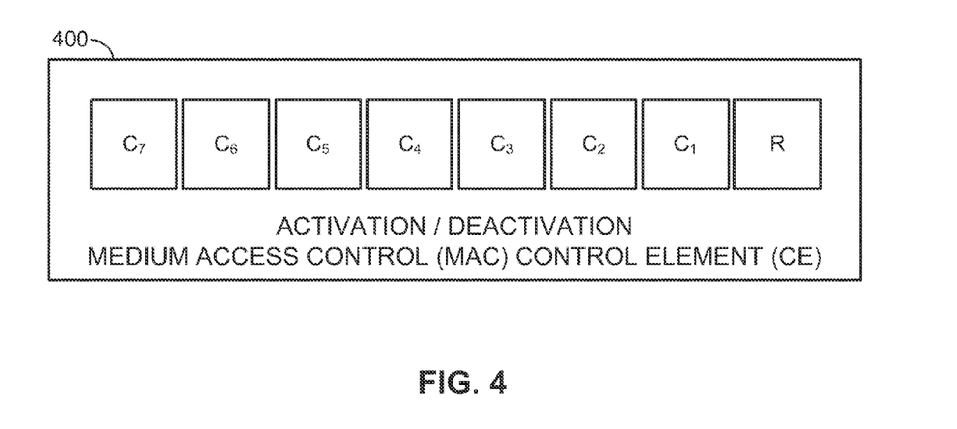
FIG. 4 illustrates an example LTE Activation/Deactivation Medium Access Control (MAC) Control Element (CE) that may be used to activate and deactivate certain access terminals in accordance with various CSAT and DRX cycling parameters.

FIG. 4 illustrates an example LTE Activation/Deactivation MAC CE that may be used to activate and deactivate certain access terminals in accordance with various CSAT and DRX cycling parameters. The Activation/Deactivation MAC CE is typically identified by a MAC Packet Data Unit (PDU) subheader with Logical Channel Identifier (LCID) set to '11011'. It typically has a fixed size and consists of a single octet containing seven C-fields and one R-field.

In particular, the illustrated Activation/Deactivation MAC CE 400 includes several SCellIndex fields ($C_i$: $C_1$-$C_7$) and a Reserved bit (R), as shown. Each SCellIndex field indicates the activation/deactivation status of the SCell with SCellIndex i. Each SCellIndex field may be set to '1' to indicate that the SCell with SCellIndex i is to be activated. Each SCellIndex field may be set to '0' to indicate that the SCell with SCellIndex i is to be deactivated. The Reserved bit may be set to '0' or some other value.

Figure 5:
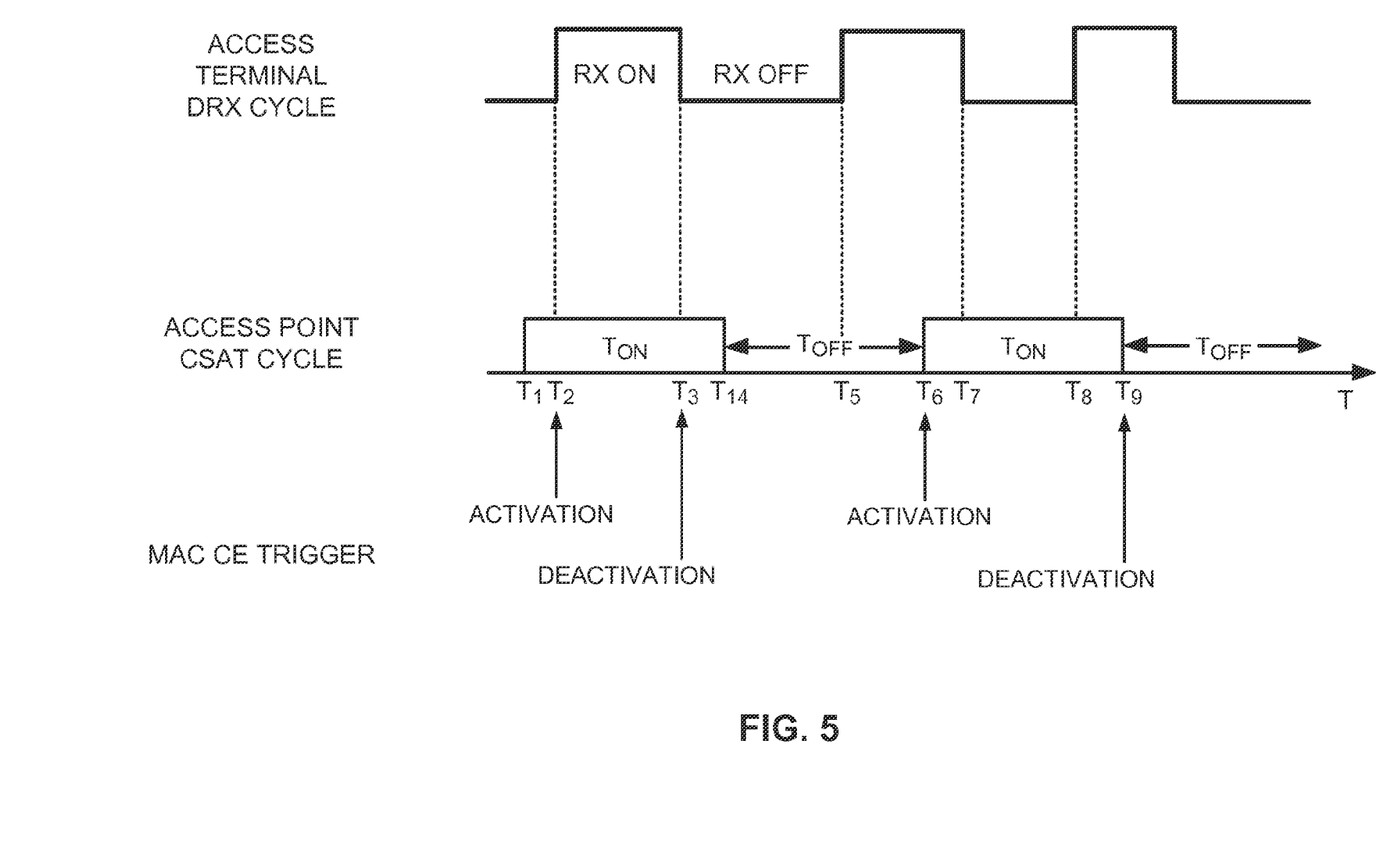
FIG. 5 illustrates an example CSAT communication scheme with DRX-awareness.

FIG. 5 illustrates an example CSAT communication scheme with DRX-awareness. In this example, an access point (e.g., the access point 110) operates in accordance with the illustrated CSAT cycle and an associated access terminal (e.g., the access terminal 120) operates in accordance with the illustrated DRX cycle.

As shown, at a first time ($T_1$), the access point turns on its transmitter in accordance with the TDM communication pattern established for CSAT communication. The access point does not, however, transmit a MAC CE activation command to the access terminal at this time because the access terminal is in a DRX OFF period and would not properly receive the command. At a second time ($T_2$), the access terminal transitions to a DRX ON period during the CSAT ON (activated) period. At or near this time, the access point may transmit the MAC CE activation command to the access terminal.

At a later time ($T_3$), the access terminal transitions to a DRX OFF period. This transition occurs before the end of the CSAT ON (activated) period ($T_4$). In anticipation of the access terminal transitioning to the DRX OFF period, the access point sends a MAC CE deactivation command to the access terminal even though the CSAT ON (activated) period is still in effect. This is because the access point is aware that this may be the last opportunity to instruct the access terminal to enter a MAC deactivated mode. At the CSAT OFF transition time ($T_4$), the access terminal will be in a DRX OFF state and unable to properly receive any MAC CEs.

At some point during the ensuing CSAT OFF (deactivated) period ($T_5$), the access terminal wakes up and enters a DRX ON state. No action is required at this point by the access point because the subsequent CSAT ON (activated) period has not yet commenced. At a later time ($T_6$), the CSAT ON (activated) period begins, and the access point sends a MAC CE activation command to the access terminal, which remains in the DRX ON state and can therefore properly receive it.

At a later time during the CSAT ON (activated) period ($T_7$), the access terminal again enters a DRX OFF state. The access point takes no action regarding the access terminal's MAC configuration mode at this time, however, because the access point is aware that at a subsequent point during the same CSAT ON (activated) period ($T_8$), the access terminal will re-enter a DRX ON state. It will be appreciated that in some designs the access point may nevertheless choose to send a MAC CE deactivation command (at $T_7$) and a corresponding MAC CE activation command (at $T_8$) in this situation, but this is not generally necessary and refraining from such additional commands may help conserve signaling resources and access terminal battery life. Instead, the access point may send a single MAC CE deactivation command at the next CSAT OFF transition ($T_9$).

In general, keeping the DRX pattern and the CSAT TDM communication pattern decoupled in accordance with the MAC CE signaling scheme described above allows each mechanism to operate more efficiently for their respective intended purposes without imposing additional cross-constraints. In some designs, however, it may be advantageous to align the DRX pattern with the CSAT TDM communication pattern, at least to a certain extent and for certain access terminals. For example, the access point may align the DRX pattern of one or more high-traffic access terminals (e.g., an access terminal served in the 5 GHz band, such as on a frequency in the range of 5.15 GHz to 5.725 GHz, which is generally associated with high traffic) with the CSAT TDM communication pattern to maximize or at least increase the overlap between the DRX ON period and the CSAT ON (activated) period, thereby increasing transmission opportunities and overall throughput for the access terminals. In the extreme scenario, the access point may disable DRX operation for those high-traffic access terminals.

Figure 6:
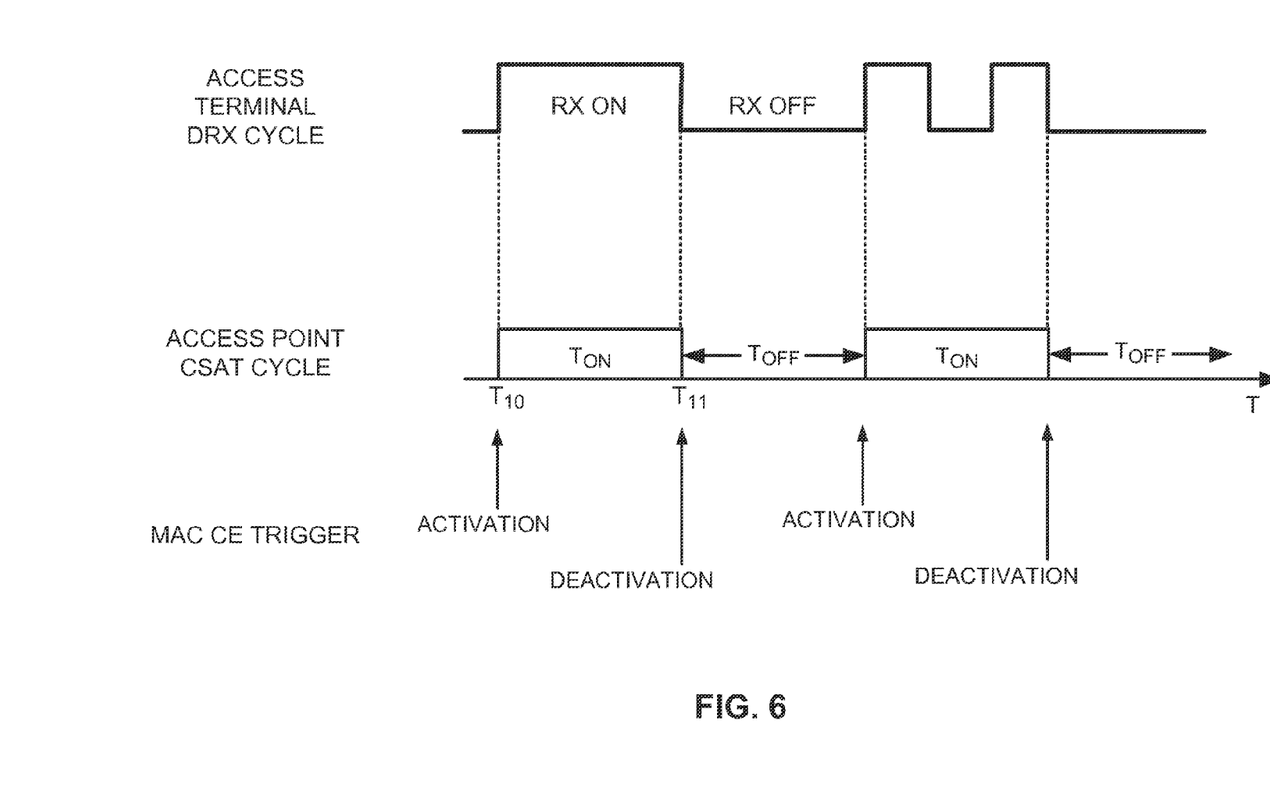
FIG. 6 illustrates another example CSAT communication scheme with DRX-awareness.

FIG. 6 illustrates another example CSAT communication scheme with DRX-awareness, where the DRX pattern is substantially aligned with the CSAT TDM communication pattern. Here, as in the example of FIG. 5, an access point (e.g., the access point 110) operates in accordance with the illustrated CSAT cycle and an associated access terminal (e.g., the access terminal 120) operates in accordance with the illustrated DRX cycle.

As shown in a first cycle, the DRX pattern may be aligned with the CSAT TDM communication pattern such that each DRX ON transition and each CSAT ON transition occur at substantially the same time ($T_{10}$), and such that each DRX OFF transition and each CSAT OFF transition occur at substantially the same time ($T_{11}$). Accordingly, the corresponding MAC CE activation command may be sent normally at or in anticipation of the CSAT ON transition time ($T_{10}$), and the corresponding MAC CE deactivation command may be sent normally at or in anticipation of the CSAT OFF transition time ($T_{11}$).

As shown in a second cycle, the DRX pattern may be aligned with the CSAT TDM communication pattern in other ways as well, with varying degrees of overlap in both time and periodicity.

Other DRX parameters may also be configured to synchronize with CSAT. For example, the DRX inactivity timer may be specially configured to maintain DRX pattern alignment with CSAT. The DRX inactivity timer sets the duration (e.g., in number of downlink subframes) that an access terminal waits to successfully decode a control channel (e.g., PDCCH) subframe from the last successful decoding, failing which the access terminal re-enters a DRX OFF state. By setting the DRX inactivity timer jointly with the access point scheduler, for example, the access point may ensure that the DRX inactivity timer does not expire and cause the DRX pattern to become out of alignment with CSAT.

Figure 7:
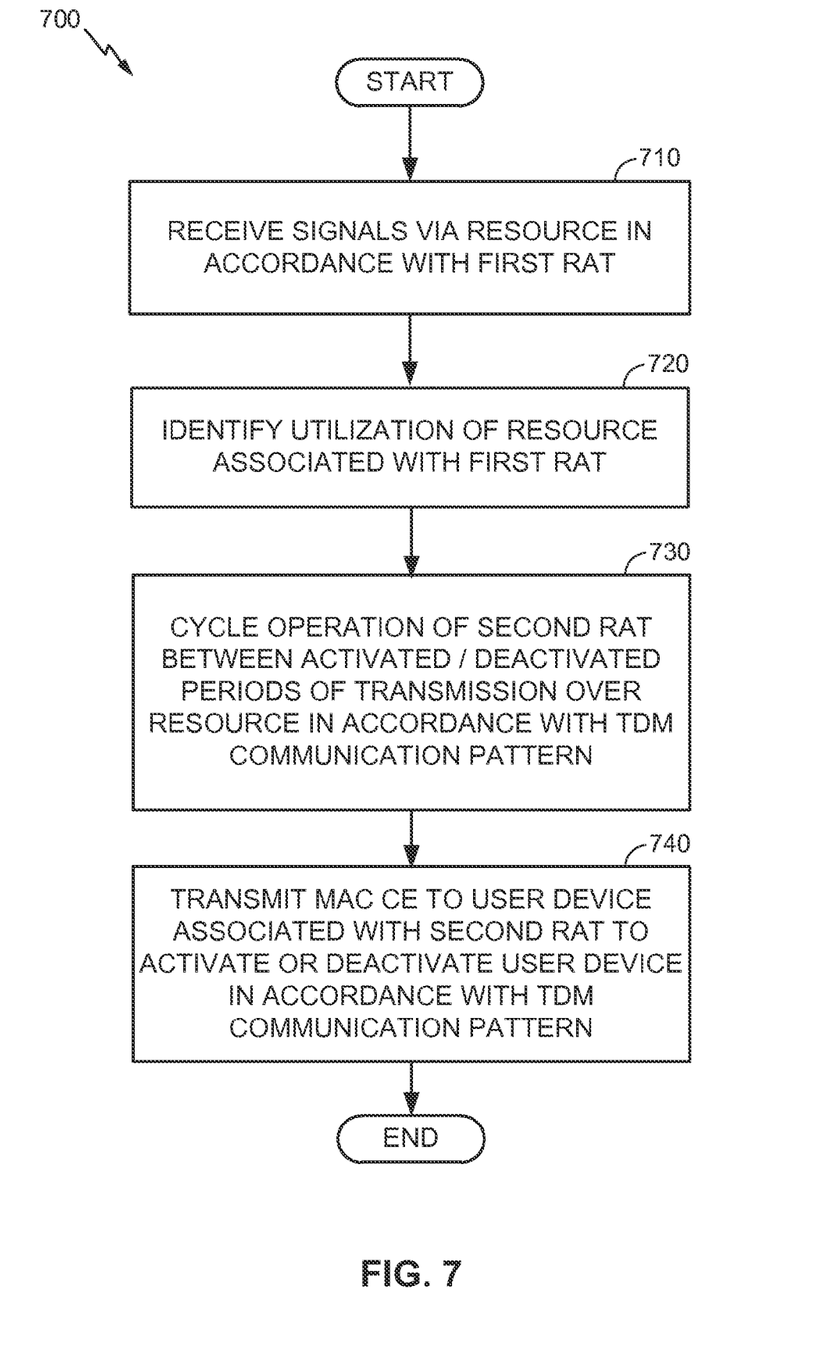
FIG. 7 is a flow diagram illustrating an example method of DRX-aware CSAT communication for managing operation on a communication medium shared between RATs.

FIG. 7 is a flow diagram illustrating an example method of DRX-aware CSAT communication for managing operation on a communication medium shared between RATs. The method 700 may be performed, for example, by an access point (e.g., the access point 110 illustrated in FIG. 1).

As shown, the method 700 may include the access point receiving signals via a resource in accordance with a first RAT (e.g., Wi-Fi) (block 710). The receiving may be performed, for example, by a transceiver such as the secondary RAT transceiver 142 or the like. The resource may be an unlicensed radio frequency band shared by Wi-Fi and LTE devices, for example. The access point may then identify utilization of the resource associated with the first RAT based on the received signals (block 720). The identifying may be performed, for example, by a medium utilization analyzer such as the medium utilization analyzer 144 or the like. Utilization of the resource may give an indication of an amount of interference (e.g., co-channel interference).

In response, the access point may cycle operation of a second RAT (e.g., LTE) between activated and deactivated periods of transmission over the resource in accordance with a TDM communication pattern (block 730). The cycling may be performed, for example, by an operating mode controller such as the operating mode controller 146 or the like. The cycling may be variously based on the identified utilization of the resource. The access point may transmit one or more MAC CEs to an access terminal (e.g., the access terminal 120) associated with the second RAT to activate or deactivate the access terminal in accordance with the TDM communication pattern (block 740). The transmitting may be performed, for example, by a transceiver such as the primary RAT transceiver 140 or the like. In accordance with the techniques herein, the timing of the MAC CE transmission may be based on not only the TDM communication pattern but also a DRX pattern associated with the access terminal.

As discussed in more detail above, the timing of the MAC CE transmission may be offset from a transition boundary of the TDM communication pattern in response to the transition boundary of the TDM communication pattern aligning with a deactivated period of the DRX pattern. For example, the transmitting may comprise transmitting a MAC CE activation command after commencement of an activated period of the TDM communication pattern in response to an activated period of the DRX pattern being scheduled to begin during the activated period of the TDM communication pattern. Conversely, the transmitting may comprise transmitting a MAC CE deactivation command before commencement of a deactivated period of the TDM communication pattern in response to a deactivated period of the DRX pattern being scheduled to begin during an activated period of the TDM communication pattern.

As also discussed in more detail above, the method may further comprise setting the DRX pattern to align with at least a portion of the TDM communication pattern in response to the access terminal being a high-traffic access terminal (e.g., an access terminal served on an SCell in the 5 GHz band, for example, in the range of 5.15 GHz to 5.725 GHz). In some cases, the setting may comprise disabling DRX for the access terminal. The method may further comprise setting other DRX parameters, such as a DRX inactivity timer, based on the TDM communication pattern.

For convenience, the access point 110 and the access terminal 120 are shown in FIG. 1 as including various components that may be configured according to the various examples described herein. It will be appreciated, however, that the illustrated blocks may be implemented in various ways. In some implementations, the components of FIG. 1 may be implemented in one or more circuits such as, for example, one or more processors and/or one or more ASICs (which may include one or more processors). Here, each circuit may use and/or incorporate at least one memory component for storing information or executable code used by the circuit to provide this functionality.

Figure 8:
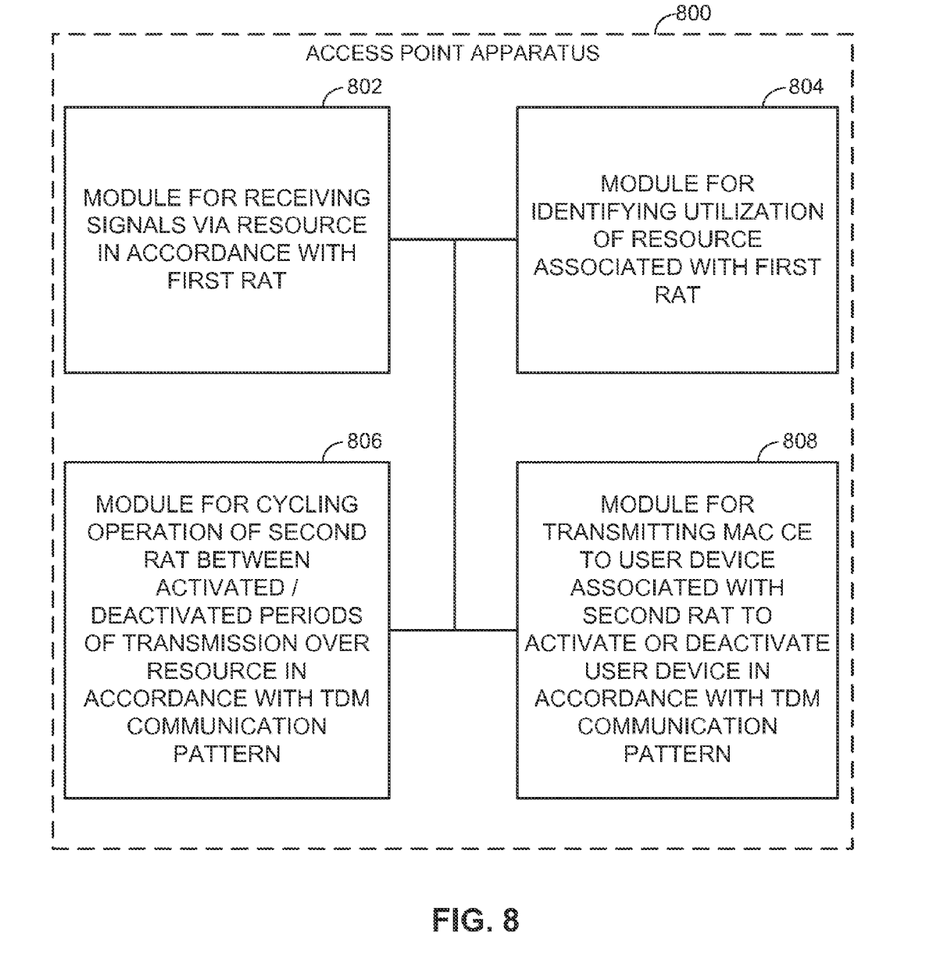
FIG. 8 illustrates an example access point apparatus represented as a series of interrelated functional modules.

FIG. 8 provides alternative illustrations of apparatuses for implementing the access point 110 and/or the access terminal 120 represented as a series of interrelated functional modules.

FIG. 8 illustrates an example access point apparatus 800 represented as a series of interrelated functional modules. A module for receiving 802 may correspond at least in some aspects to, for example, a communication device or a component thereof as discussed herein (e.g., the communication device 112 or the like). A module for identifying 804 may correspond at least in some aspects to, for example, a communication controller or a component thereof as discussed herein (e.g., the communication controller 114 or the like). A module for cycling 806 may correspond at least in some aspects to, for example, a communication controller or a component thereof as discussed herein (e.g., the communication controller 114 or the like). A module for transmitting 808 may correspond at least in some aspects to, for example, a communication device or a component thereof as discussed herein (e.g., the communication device 112 or the like).

The functionality of the modules of FIG. 8 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 8, as well as other components and functions described herein, may be implemented using any suitable means. Such means also may be implemented, at least in part, using corresponding structure as taught herein. For example, the components described above in conjunction with the "module for" components of FIG. 8 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for CSAT for managing operation on a communication medium shared between RATs.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of Carrier Sense Adaptive Transmission (CSAT) for managing operation on a communication medium shared between Radio Access Technologies (RATs), comprising:
receiving signals via the communication medium in accordance with a first RAT;
identifying utilization of the communication medium associated with the first RAT based on the received signals;
cycling operation of a second RAT between activated and deactivated periods of transmission over the communication medium in accordance with a Time Division Multiplexing (TDM) communication pattern, wherein the cycling is based on the identified utilization of the communication medium; and
transmitting a Medium Access Control (MAC) Control Element (CE) to an access terminal associated with the second RAT to activate or deactivate the access terminal in accordance with the TDM communication pattern, wherein a timing of the MAC CE transmission is based on the TDM communication pattern and a Discontinuous Reception (DRX) pattern associated with the access terminal.

2. The method of claim 1, wherein the timing of the MAC CE transmission is offset from a transition boundary of the TDM communication pattern in response to the transition boundary of the TDM communication pattern aligning with a deactivated period of the DRX pattern.

3. The method of claim 2, wherein the transmitting comprises transmitting a MAC CE activation command after commencement of an activated period of the TDM communication pattern in response to an activated period of the DRX pattern being scheduled to begin during the activated period of the TDM communication pattern.

4. The method of claim 2, wherein the transmitting comprises transmitting a MAC CE deactivation command before commencement of a deactivated period of the TDM communication pattern in response to a deactivated period of the DRX pattern being scheduled to begin during an activated period of the TDM communication pattern.

5. The method of claim 1, further comprising setting the DRX pattern to align with at least a portion of the TDM communication pattern in response to the access terminal being a high-traffic access terminal.

6. The method of claim 5, further comprising identifying the access terminal as a high-traffic access terminal based on the access terminal being served on a frequency in the range of 5.15 GHz to 5.725 GHz.

7. The method of claim 5, wherein the setting comprises disabling DRX for the access terminal.

8. The method of claim 1, further comprising setting a DRX inactivity timer based on the TDM communication pattern.

9. The method of claim 1, wherein the communication medium is an unlicensed radio frequency band.

10. The method of claim 1, wherein:
the first RAT comprises Wi-Fi technology; and
the second RAT comprises Long Term Evolution (LTE) technology.

11. An apparatus for Carrier Sense Adaptive Transmission (CSAT) for managing operation on a communication medium shared between Radio Access Technologies (RATs), comprising:
a first transceiver configured to receive signals via the communication medium in accordance with a first RAT;
at least one processor;
at least one memory coupled to the at least one processor, the at least one processor and the at least one memory being configured to:
identify utilization of the communication medium associated with the first RAT based on the received signals, and
cycle operation of a second RAT between activated and deactivated periods of transmission over the communication medium in accordance with a Time Division Multiplexing (TDM) communication pattern, wherein the at least one processor and the at least one memory are configured to cycle operation of the second RAT based on the identified utilization of the communication medium; and
a second transceiver configured to transmit a Medium Access Control (MAC) Control Element (CE) to an access terminal associated with the second RAT to activate or deactivate the access terminal in accordance with the TDM communication pattern, wherein a timing of the MAC CE transmission is based on the TDM communication pattern and a Discontinuous Reception (DRX) pattern associated with the access terminal.

12. The apparatus of claim 11, wherein the timing of the MAC CE transmission is offset from a transition boundary of the TDM communication pattern in response to the transition boundary of the TDM communication pattern aligning with a deactivated period of the DRX pattern.

13. The apparatus of claim 12, wherein the second transceiver is configured to transmit a MAC CE activation command after commencement of an activated period of the TDM communication pattern in response to an activated period of the DRX pattern being scheduled to begin during the activated period of the TDM communication pattern.

14. The apparatus of claim 12, wherein the second transceiver is configured to transmit a MAC CE deactivation command before commencement of a deactivated period of the TDM communication pattern in response to a deactivated period of the DRX pattern being scheduled to begin during an activated period of the TDM communication pattern.

15. The apparatus of claim 11, wherein the at least one processor and the at least one memory are further configured to set the DRX pattern to align with at least a portion of the TDM communication pattern in response to the access terminal being a high-traffic access terminal.

16. The apparatus of claim 15, wherein the at least one processor and the at least one memory are further configured to identify the access terminal as a high-traffic access terminal based on the access terminal being served on a frequency in the range of 5.15 GHz to 5.725 GHz.

17. The apparatus of claim 15, wherein the at least one processor and the at least one memory are configured to set the DRX pattern by disabling DRX for the access terminal.

18. The apparatus of claim 11, wherein the at least one processor and the at least one memory are further configured to set a DRX inactivity timer based on the TDM communication pattern.

19. The apparatus of claim 11, wherein the communication medium is an unlicensed radio frequency band.

20. The apparatus of claim 11, wherein:
the first RAT comprises Wi-Fi technology; and
the second RAT comprises Long Term Evolution (LTE) technology.

21. An apparatus for Carrier Sense Adaptive Transmission (CSAT) for managing operation on a communication medium shared between Radio Access Technologies (RATs), comprising:
means for receiving signals via the communication medium in accordance with a first RAT;
means for identifying utilization of the communication medium associated with the first RAT based on the received signals;
means for cycling operation of a second RAT between activated and deactivated periods of transmission over the communication medium in accordance with a Time Division Multiplexing (TDM) communication pattern, wherein the cycling is based on the identified utilization of the communication medium; and
means for transmitting a Medium Access Control (MAC) Control Element (CE) to an access terminal associated with the second RAT to activate or deactivate the access terminal in accordance with the TDM communication pattern, wherein a timing of the MAC CE transmission is based on the TDM communication pattern and a Discontinuous Reception (DRX) pattern associated with the access terminal.

22. The apparatus of claim 21, wherein the timing of the MAC CE transmission is offset from a transition boundary of the TDM communication pattern in response to the transition boundary of the TDM communication pattern aligning with a deactivated period of the DRX pattern.

23. The apparatus of claim 22, wherein the means for transmitting comprises means for transmitting a MAC CE activation command after commencement of an activated period of the TDM communication pattern in response to an activated period of the DRX pattern being scheduled to begin during the activated period of the TDM communication pattern.

24. The apparatus of claim 22, wherein the means for transmitting comprises means for transmitting a MAC CE deactivation command before commencement of a deactivated period of the TDM communication pattern in response to a deactivated period of the DRX pattern being scheduled to begin an activated period of the TDM communication pattern.

25. The apparatus of claim 21, wherein:
the communication medium is an unlicensed radio frequency band;
the first RAT comprises Wi-Fi technology; and
the second RAT comprises Long Term Evolution (LTE) technology.

26. A non-transitory computer-readable medium comprising instructions, which, when executed by a processor, cause the processor to perform operations for Carrier Sense Adaptive Transmission (CSAT) for managing operation on a communication medium shared between Radio Access Technologies (RATs), the non-transitory computer-readable medium comprising:
instructions for receiving signals via the communication medium in accordance with a first RAT;
instructions for identifying utilization of the communication medium associated with the first RAT based on the received signals;
instructions for cycling operation of a second RAT between activated and deactivated periods of transmission over the communication medium in accordance with a Time Division Multiplexing (TDM) communication pattern, wherein the cycling is based on the identified utilization of the communication medium; and
instructions for transmitting a Medium Access Control (MAC) Control Element (CE) to an access terminal associated with the second RAT to activate or deactivate the access terminal in accordance with the TDM communication pattern, wherein a timing of the MAC CE transmission is based on the TDM communication pattern and a Discontinuous Reception (DRX) pattern associated with the access terminal.

27. The non-transitory computer-readable medium of claim 26, wherein the timing of the MAC CE transmission is offset from a transition boundary of the TDM communication pattern in response to the transition boundary of the TDM communication pattern aligning with a deactivated period of the DRX pattern.

28. The non-transitory computer-readable medium of claim 27, wherein the instructions for transmitting comprise instructions for transmitting a MAC CE activation command after commencement of an activated period of the TDM communication pattern in response to an activated period of the DRX pattern being scheduled to begin during the activated period of the TDM communication pattern.

29. The non-transitory computer-readable medium of claim 27, wherein the instructions for transmitting comprise instructions for transmitting a MAC CE deactivation command before commencement of a deactivated period of the TDM communication pattern in response to a deactivated period of the DRX pattern being scheduled to begin during an activated period of the TDM communication pattern.

30. The non-transitory computer-readable medium of claim 26, wherein:
the communication medium is an unlicensed radio frequency band;
the first RAT comprises Wi-Fi technology; and
the second RAT comprises Long Term Evolution (LTE) technology.

* * * * *